(12) United States Patent
Miller

(10) Patent No.: US 12,106,340 B2
(45) Date of Patent: Oct. 1, 2024

(54) DATA ACTIVITY VISIBILITY

(71) Applicant: DASH FINANCIAL TECHNOLOGIES LLC, New York, NY (US)

(72) Inventor: Timothy Miller, Chicago, IL (US)

(73) Assignee: Dash Financial Technologies LLC, New York, NY (US)

( * ) Notice: Subject to any disclaimer, the term of this patent is extended or adjusted under 35 U.S.C. 154(b) by 492 days.

(21) Appl. No.: 17/020,037

(22) Filed: Sep. 14, 2020

(65) Prior Publication Data

US 2021/0097588 A1    Apr. 1, 2021

Related U.S. Application Data

(60) Provisional application No. 63/019,767, filed on May 4, 2020, provisional application No. 62/926,217, filed on Oct. 25, 2019, provisional application No. 62/906,196, filed on Sep. 26, 2019.

(51) Int. Cl.
| | |
|---|---|
| *G06Q 30/00* | (2023.01) |
| *G06F 7/58* | (2006.01) |
| *G06Q 30/04* | (2012.01) |
| *G06Q 40/04* | (2012.01) |

(52) U.S. Cl.
CPC .............. *G06Q 30/04* (2013.01); *G06F 7/582* (2013.01); *G06Q 40/04* (2013.01)

(58) Field of Classification Search
CPC ......... G06Q 30/04; G06Q 40/04; G06F 7/582
See application file for complete search history.

(56) References Cited

U.S. PATENT DOCUMENTS

| | | | |
|---|---|---|---|
| 2010/0093308 A1* | 4/2010 | Cohan | H04W 12/084 455/414.1 |
| 2014/0149275 A1 | 5/2014 | Saliba | |
| 2016/0328796 A1* | 11/2016 | Acuña-Rohter | G06Q 10/107 |

OTHER PUBLICATIONS

International Searching Authority; PCT International Search Report and Written Opinion for PCT/US2020/053106 mailed on Nov. 25, 2020; 14 pages.
Wikipedia; Unique Transaction Identifier; Aug. 16, 2020; 2 pages.
CPMI-IOSCO Technical Guidance; Harmonization of the Unique Transaction Identifier; Feb. 2017; 25 pages.

(Continued)

*Primary Examiner* — Rokib Masud
(74) *Attorney, Agent, or Firm* — Merchant & Gould P.C.

(57) ABSTRACT

Disclosed examples include systems, methods, and computer products relating to data activity visibility though the use of an identifier. A method includes receiving registration data regarding a customer. The customer is registered in association with a set of customer data. An identifier is generated that encrypts the set of customer data. The identifier is transmitted to a front-end device that sends the identifier as part of a transaction message. An executed transaction report containing the identifier and relating to a transaction is received from an exchange. The set of customer data is determined from the identifier of the executed transaction report. A request is received from an authorized entity device. Dashboard data is provided for rendering at the authorized entity device that includes data regarding the transaction in association with the customer.

20 Claims, 8 Drawing Sheets

(56) References Cited

OTHER PUBLICATIONS

Hofsten, Linnea Von; KTH Royal Institute of Technology, School of Industrial Engineering and Management; Understanding Financial Regulations—A Case Study of European Regulations; 2017; 82 pages.
ISDA; ISDA MiFID DP Submission; Jul. 31, 2014; 150 pages.
CORVIL; A-Team Group, Trading Regulations Handbook, First Edition, 2017, 58 pages.
Borsa Italiana; Sola Trading System—Version 14, Release Notes; Jan. 27, 2020; 13 pages.
CFTC Office of Data and Technology; Unique Swap Identifier (USI) Data Standard; Oct. 1, 2012; 5 pages.
Epicsandbox; OTC Confirmation and Claim—FpML API; 4 pages.

\* cited by examiner

| | | | | | | | | | | |
|---|---|---|---|---|---|---|---|---|---|---|
| Date | Time | Account | Sec Type | Symbol | Side | O/C | Exec Qty | Exec Px | Principal Amount |
| ▶08/27/2019 | 16:14:05:962 | Dash916Desk31 | Option | SPY JAN20 225P | Bought | Open | 11 | $1.6300 | $1,793.00 |
| ▶08/27/2019 | 16:14:03:989 | Dash916Desk31 | Option | SPY DEC19 290P | Bought | Open | 50 | $13.4000 | $67,000.00 |
| ▶08/27/2019 | 16:14:01:316 | Dash916Desk19 | Option | QQQ SEP19 170P | Bought | Open | 47 | $0.9300 | $4,371.00 |
| ▶08/27/2019 | 16:13:09:824 | Dash916Desk31 | Option | SPY AUG19 285P | Sold | Open | 3 | $1.7100 | $513.00 |
| ▶08/27/2019 | 16:13:00:440 | Dash916Desk31 | Option | SPY AUG19 281.5P | Sold | Open | 3 | $0.8400 | $252.00 |
| ▶08/27/2019 | 16:12:12:314 | Dash916Desk22 | Option | VXX DEC19 20P | Sold | Open | 1 | $0.7600 | $76.00 |
| ▶08/27/2019 | 16:08:59:891 | Dash916Desk17 | Option | IWM JAN20 154C | Bought | Open | 1 | $3.0800 | $308.00 |
| ▶08/27/2019 | 16:08:37:669 | Dash916Desk31 | Option | SPY NOV19 293C | Bought | Open | 1 | $6.1600 | $616.00 |
| ▶08/27/2019 | 16:07:49:528 | Dash916Desk31 | Option | SPY NOV19 293C | Bought | Open | 2 | $6.1300 | $1,226.00 |
| ▶08/27/2019 | 16:07:49:509 | Dash916Desk31 | Option | SPY NOV19 293C | Bought | Open | 20 | $6.1300 | $12,260.00 |
| ▶08/27/2019 | 16:07:49:499 | Dash916Desk31 | Option | SPY NOV19 292C | Bought | Open | 18 | $6.6600 | $11,988.00 |

Trade Desk: (888) 555-3270  Concierge: (888) 555-3274  Hi, User

Allocations  By Trading Account  By Clearing Account

Account(s): All Selected  Date: Today's activity  CLEAR | GO

Drag here to set row groups  Quick search

| Account | Clearin... | Symbol | Sec Type | Side | Exec Qty | Avg Px |
|---|---|---|---|---|---|---|
| SPGSCPTA | 005 | SPY SEP19 305C | Option | SLD | 0 | - |
| SPGSCPTA | 019 | SPY SEP19 305C | Option | SLD | 0 | - |
| SPGSCPTA | 050 | SPY SEP19 305C | Option | SLD | 0 | - |
| SPGSCPTA | 080 | SPY SEP19 305C | Option | SLD | 0 | - |
| SPGSCPTA | 161 | SPY SEP19 305C | Option | SLD | 0 | - |
| SPGSCPTA | 250 | SPY SEP19 305C | Option | SLD | 0 | - |
| SPGSCPTA | 352 | SPY SEP19 305C | Option | SLD | 0 | - |
| SPGSCPTA | 355 | SPY SEP19 305C | Option | SLD | 0 | - |
| SPGSCPTA | 444 | SPY SEP19 305C | Option | SLD | 0 | - |
| SPGSCPTA | 505 | SPY SEP19 305C | Option | SLD | 0 | - |
| SPGSCPTA | 551 | SPY SEP19 305C | Option | SLD | 1,000 | $0.3200 |
| SPGSCPTA | 586 | SPY SEP19 305C | Option | SLD | 0 | - |
| SPGSCPTA | 615 | SPY SEP19 305C | Option | SLD | 0 | - |
| SPGSCPTA | 792 | SPY SEP19 305C | Option | SLD | 0 | - |

| Submitted At | Operati... | Trading Firm | Symbol | Requested By | Claimed By | Status | Actions |
|---|---|---|---|---|---|---|---|
| ▶ 08/27/2019 10:12:35 | ⇄ Modify | Firm 1 Trading Desk | PSX JAN20 92.5C | User 1 | User 2 | Done | |
| ▶ 08/30/2019 10:10:47 | ⇄ Modify | Firm 2 Trading Desk | SPY AUG19 295C | User 2 | User 2 | Done | |
| ▼ 08/30/2019 09:31:54 | ⇄ Modify | Firm 1 Trading Desk | TTM JAN20 8P | User 3 | User 3 | Done | |

Request Details: Execution Date: 08/30/2019  Claimed At: 08/30/2019 09:31:59  Processed At: 08/30/2019 09:32:00

| Price Point | Child Executions | | | | | | | | | | |
|---|---|---|---|---|---|---|---|---|---|---|---|
| Exch Name | Symbol | Exp Date | Side | O/C | Exec Px | Exec Qty | Total Qty | CMTA | Account | Capacity | Cleanin... | Client ID | Actions |
| ARCA Options | TTM JAN20 8P | 17 Jan 20 | Bought | Open | $0.85 | 21 | 42 | 333 – 'Dash Fin... | 608 – 'SG Americas | CACEIS | Customer | - | rzagaroli [GENERATE EMAIL] |

DATA ACTIVITY VISIBILITY

CROSS-REFERENCE TO RELATED APPLICATIONS

This application claims priority to U.S. Provisional Application 63/019,767, which was filed May 4, 2020; U.S. Provisional Patent Application 62/906,196, which was filed on Sep. 26, 2019; and U.S. Provisional Patent Application 62/926,217, which was filed on Oct. 25, 2019. Each of these applications is incorporated herein by reference in its entirety for any and all purposes.

BACKGROUND

Challenges in current brokerage systems result in significant inefficiency due to processing delays. For example, when prime brokers have customers that make trades through third parties, data regarding such trades is often unavailable to the prime brokers until the end of the day. As a result, prime brokers generally are not aware of what trading activity is occurring before the end of the day, which exposes the prime broker to risk.

Trades typically include some form of identifying information, such as a client identifier or an account value, but such values typically are only meaningful to the party sending the trade. Recently, the use of identifiers in security and options trades has been proposed to allow members to timely identify trades. But there are technical challenges in implementing an identifier system efficiently that not only preserves anonymity of certain participants in the trade but also appropriately exposes information those authorized to receive the information.

SUMMARY

In an example, there is a method comprising: receiving registration data regarding a customer; registering the customer in association with a set of customer data; generating an identifier that encrypts the set of customer data; transmitting the identifier to a front-end broker device; receiving, from an exchange, an executed transaction report containing the identifier and relating to a transaction; determining the set of customer data from the identifier of the executed transaction report; receiving a request from an authorized entity device; and providing, to the authorized entity device, dashboard data for rendering at the authorized entity device that includes data regarding the transaction in association with the customer.

In some examples, the method further includes: receiving, from the registered customer, a set of broker data regarding a broker; and registering the broker in association with the customer. The identifier can be further generated based on the registered broker. The identifier can expire after a predetermined amount of time. The predetermined amount of time is less than or equal to twenty-four hours. The set of customer data can include a customer identifier, a fund or clearing agent identifier, and a broker identifier. Generating the identifier can include encrypting the set of customer data with a key. Generating the identifier can further include encrypting the set of customer data and a salt with the key. Generating the identifier that encrypts the set of customer data can include generating a pseudorandom value; associating the pseudorandom value with the set of customer data in a data structure; and using the pseudorandom value as the identifier. The method can further include generating a billing report based on a plurality of received executed transaction reports; and transmitting the billing report to an entity. The method can further include generating a compliance audit report based on a plurality of received executed transaction messages; and transmitting the compliance audit report to an entity.

In an example, there is a system that includes one or more servers comprising one or more processors; and a front-end device comprising one or more processors. The one or more servers are configured to: receive registration data regarding a customer; register the customer in association with customer data; generate an identifier that encrypts at least some of the customer data; and provide the identifier to a front-end device. The front-end device can be configured to receive the identifier; generate a transaction message that includes the identifier; and transmit the transaction message to an exchange. The one or more servers can be further configured to: receive, from the exchange, an executed transaction message containing the identifier and relating to a transaction; determine the customer data from the identifier of the received message; receive a request from an authorized entity; provide, to the authorized entity, a dashboard that includes data regarding the transaction in association with the customer.

The one or more servers can be further configured to receive, from the registered customer, a set of broker data regarding a broker; and register the broker in association with the customer. The identifier can be further generated based on the registered broker. The identifier expires after a predetermined amount of time that is less than or equal to twenty-four hours. The set of customer data can include a customer identifier, a fund or clearing agent identifier, and a broker identifier. Generating the identifier can include encrypting the set of customer data and a salt with a key. Generating the identifier that encrypts the set of customer data can include to generate a pseudorandom value; associate the pseudorandom value with the set of customer data in a data structure; and use the pseudorandom value as the identifier. The one or more servers can be further configured to generate a billing or compliance report based on a plurality of received executed transaction reports; and transmit the report to an entity.

In an example, there is a method that includes for each respective broker of a plurality of brokers associated with a respective customer of a plurality of customers, periodically transmitting at least one encrypted identifiers to a front-end device associated with the respective broker for use in handling trades for the respective customer; receiving transaction reports having encrypted identifiers; updating stored financial data based on the encrypted identifiers; and providing a dashboard visualizing at least some of the stored financial data to authorized users.

In an example, the method further includes providing varying levels of access to the stored financial data to requesting parties. Providing the varying levels of access to the stored financial data to requesting parties can include providing to a prime broker device a real-time visualization of risk associated with a customer of the prime broker based on the stored financial data via an application programming interface; providing, to an equity derivatives clearing entity device, member firm risk data in real-time without revealing customer identities to the equity derivatives clearing entity; providing auditable billing data on a by-broker basis to an institutional customer; and providing auditable billing data on a by-clients basis to a broker.

BRIEF DESCRIPTION OF THE DRAWINGS

The same number represents the same element or same type of element in all drawings.

FIG. 3 illustrates an example execution screen dashboard.

FIG. 5 illustrates an example allocations screen dashboard.

FIG. 6 illustrates an example clearing dashboard.

DETAILED DESCRIPTION

Technology disclosed herein is relevant to addressing technical challenges in the use of identifiers to ensure appropriate levels of access to data, such as data regarding transactions.

According to an example implementation, a broker receives an order for a trade (e.g., an options trade) and enters the order into a front-end device on behalf of a customer for execution. The front-end device then creates a message (e.g., according to the Financial Information eXchange (FIX) protocol) for the trade and populates the message with at least one identifier. The identifier can be the result of encrypting customer data and can be used to uniquely identify the broker and customer associated with the transaction while also not readily revealing such information on its face (e.g., without decryption, the underlying data is unintelligible). The customer can be assigned multiple identifiers used in associated transactions. The order can be filled at an exchange based on the message (e.g., directly or via a third party). A copy of the message can be sent to a server 110 from a clearing entity (e.g., the Options Clearing Corporation). The server 110 decrypts the identifier and makes available, via a dashboard, information relating to the trade or the message to predetermined parties. The parties can include entities authorized to view the data, such as a prime broker, originating broker, the clearing entity, and the institutional customer. In one example embodiment herein, the data can be presented in real-time.

The examples described herein can be implemented using a system, such as the one presented in FIG. 1 and described below.

System

Figure 1:
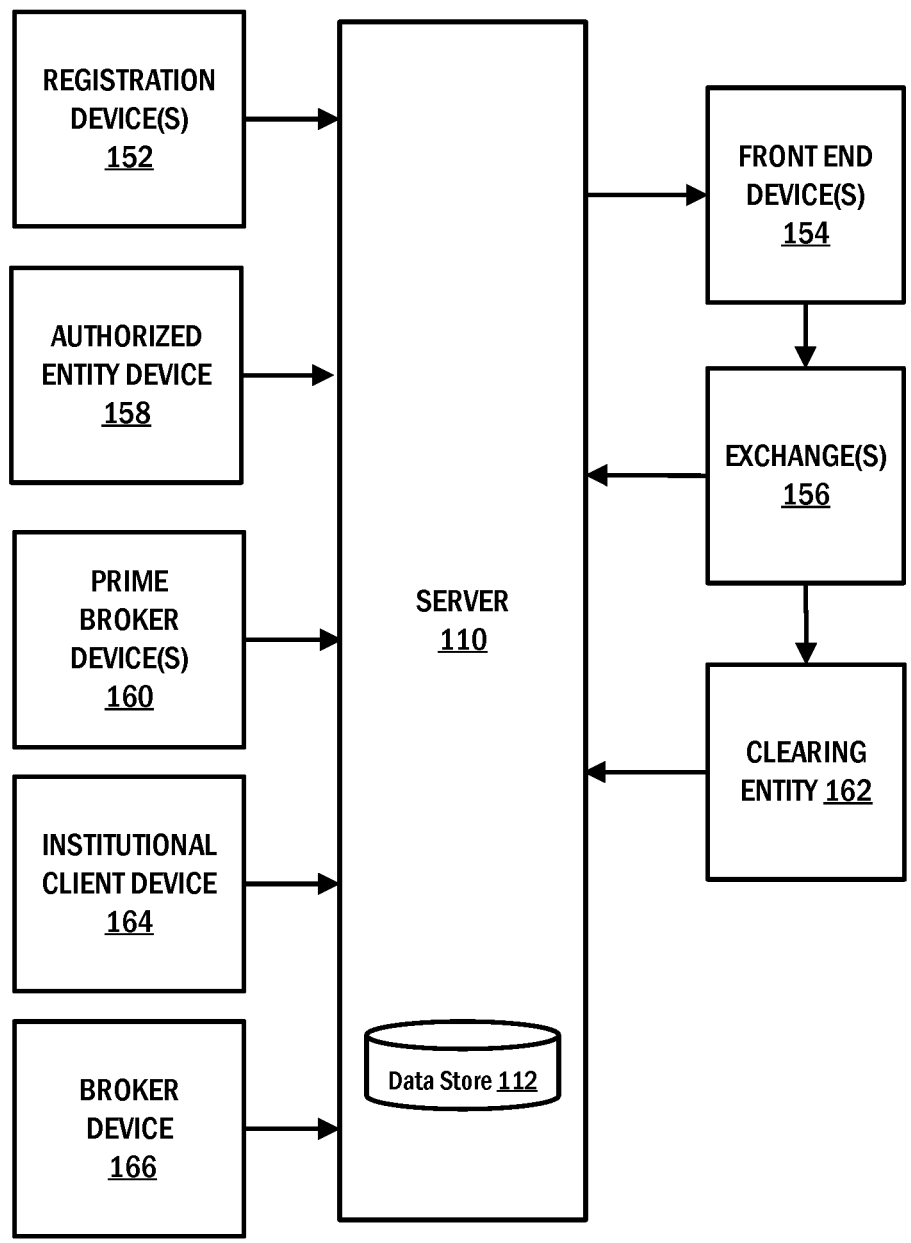
FIG. 1 illustrates an example system with which examples described herein can be implemented.

FIG. 1 illustrates an example system 100. As illustrated, the system 100 can include a server 110, one or more registration devices 152, one or more front-end devices 154, one or more exchanges 156, one or more authorized entity devices 158, one or more prime broker devices 160, one or more clearing entity devices 162, one or more institutional customer devices 164, and one or more broker devices 166. The components of the system 100 can be implemented as computing devices, such as is described in FIG. 3, and can communicate directly or over a communication network, such as the Internet.

The server 110 is a set of one or more server computing devices that perform processes and communicate with customer devices. As discussed in more detail below, the server 110 can perform operations that facilitate the use of identifiers to track data regarding transactions and provide dashboards relating thereto. For convenience, the server 110 is referred to herein as a singular server device, but the server 110 can take any of a variety of forms and have one or more operations spread across multiple devices. The server 110 can include a data store 112.

The data store 112 is a set of one or more hardware or software components of the server 110 that store data. The data store 112 can be or include one or more data structures configured to store data. In many examples, the data store 112 includes one or more databases storing data regarding transactions.

The one or more registration devices 152 are computing devices via which a user provides customer registration data to the server 110. The one or more registration devices 152 can take any of a variety of forms, including general purpose consumer computing devices, such as laptop computers, desktop computers, phones, tablets, virtual reality devices, augmented reality devices, or other computing devices.

The one or more front-end devices 154 are computing devices for use in trading on one or more of the exchanges 156. While the one or more front-end devices 154 can be general purpose computing devices, in many examples, the one or more front-end devices 154 are configured as specialized trading or brokering workstations (e.g., via specialized hardware or software). Techniques described herein can provide front-end devices 154 with a workflow solution allowing brokers to comply with actionable identifier requirements as well as providing anonymity for customers. In addition, techniques can allow brokers to process changes at an initial level that are propagated to additional levels.

The one or more exchanges 156 are platforms that provide for the trading of securities or other tradeable assets. The exchanges 156 can be at least partially computerized, such that transactions can be electronically made on an exchange 156 via brokers operating on the front-end devices 154. In some examples, the one or more exchanges 156 communicate via defined communication protocols, such as the FIX protocol.

The one or more authorized entity devices 158 can be computing devices (e.g., consumer devices or special-purpose financial workstation devices) usable by an authorized entity to access data provided by the server 110. As described herein, various entities can be authorized to access particular data provided by the server 110 relating to, for example, transactions made by or for the entity. The one or more authorized entity devices 158 can be a device via which such data can be accessed.

The one or prime broker devices 160 can be computing devices (e.g., consumer or special-purpose financial workstation devices) used by prime brokers. Techniques disclosed herein can be used to provide prime brokers with the ability to monitor their individual customer risk in real time. Using traditional techniques, large institutional prime brokers are unable to monitor risk in real time when customer's trade with other broker-dealers. Thus, prime brokers have limited ability to associate executions intra-day with individual customers. As a result, prime brokers are traditionally forced to wait until the end of the day when trades are booked to allocate positions and risk across their customer base. Techniques described herein can ameliorate this problem by granting prime brokers with data relevant to such risk. Further, prime brokers (e.g., using the prime broker devices 160) can use techniques described herein to mitigate trade breaks, thereby providing the prime brokers with increased stability. Through the system 100, institutional customers (e.g., via the institutional customer devices 164)

can confirm trades against brokers on an intra-day basis, greatly decreasing the likelihood of T+1 breaks. Clearing brokers can also have a view within the prime brokers portal to allow them to monitor risks of their clearing customers. In addition, prime brokers can use this system 100 to effectively manage and gain control over CMTA (Clearing Member Trade Agreement) and give-up risk. For at least these reasons, techniques described herein can provide advantages over traditional techniques.

The one or more clearing entity devices 162 are devices (e.g., consumer computing devices or special-purpose financial workstation devices) used by one or more entities that engage in clearing (e.g., equity derivatives clearing). Such clearing entities can be authorized to access details provided by the server 110 of trades performed by firms that are members of the clearing entity. In example implementations, the entities can benefit from use of the system 100 to minimize T+1 breaks and by allowing real-time visibility into member firm risk. But at the same time, implementations of the system 100 can provide such information without compromising the integrity of the member firms' customer bases. Employees of the clearing entities can use the one or more clearing entity devices 162 to access relevant information provided by the server 110.

The one or more institutional customer devices 164 are devices (e.g., consumer computing devices or special-purpose financial workstation devices) used by one or more institutional customers. Employees of institutional customers can use the institutional customer devices 164 to provide a same day check-out process with brokers, thereby allowing the mitigation of risk. Further, the institutional customer devices 164 can be used as Post Trade Allocation (PTA) tools to allocate trades to multiple or different prime brokers, as necessary. Thus, by using the technology provided by the server 110, operational efficiency can be increased in a manner that is not currently available in the options landscape today. This would also provide institutional customers an auditable billing solution. In examples, the institutional customer devices 164 can be used to permission executing brokers.

The one or more broker devices 166 are computing devices (e.g., consumer or special-purpose financial workstation devices) used by one or more brokers. While such brokers may also use the front-end devices 154, the brokers may use other devices for other tasks, such as customer billing or compliance auditing. For example, a broker may use the one or more broker devices 166 to access data provided by the server 110 regarding billing or compliance. In examples, the one or more broker devices 166 can be used to associate permissioned customers (e.g., institutional customers) to the broker's execution work stream.

The components of the system 100 can cooperate to perform a method, such as is described in FIG. 2.

Method

Figure 2A:
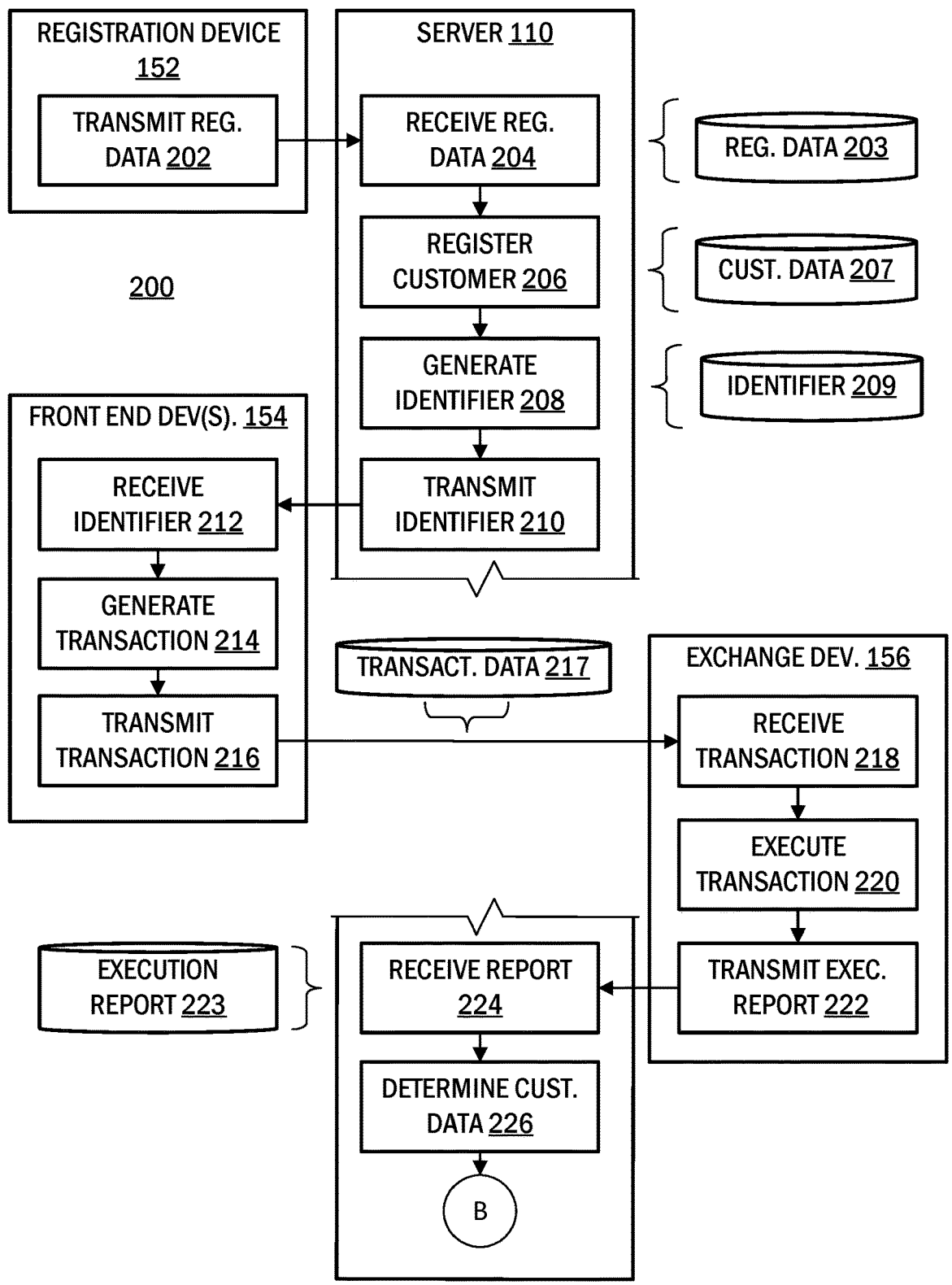
FIG. 2, which is made up of FIG. 2A and FIG. 2B, illustrates an example process performable by components of the system.
Figure 2B:
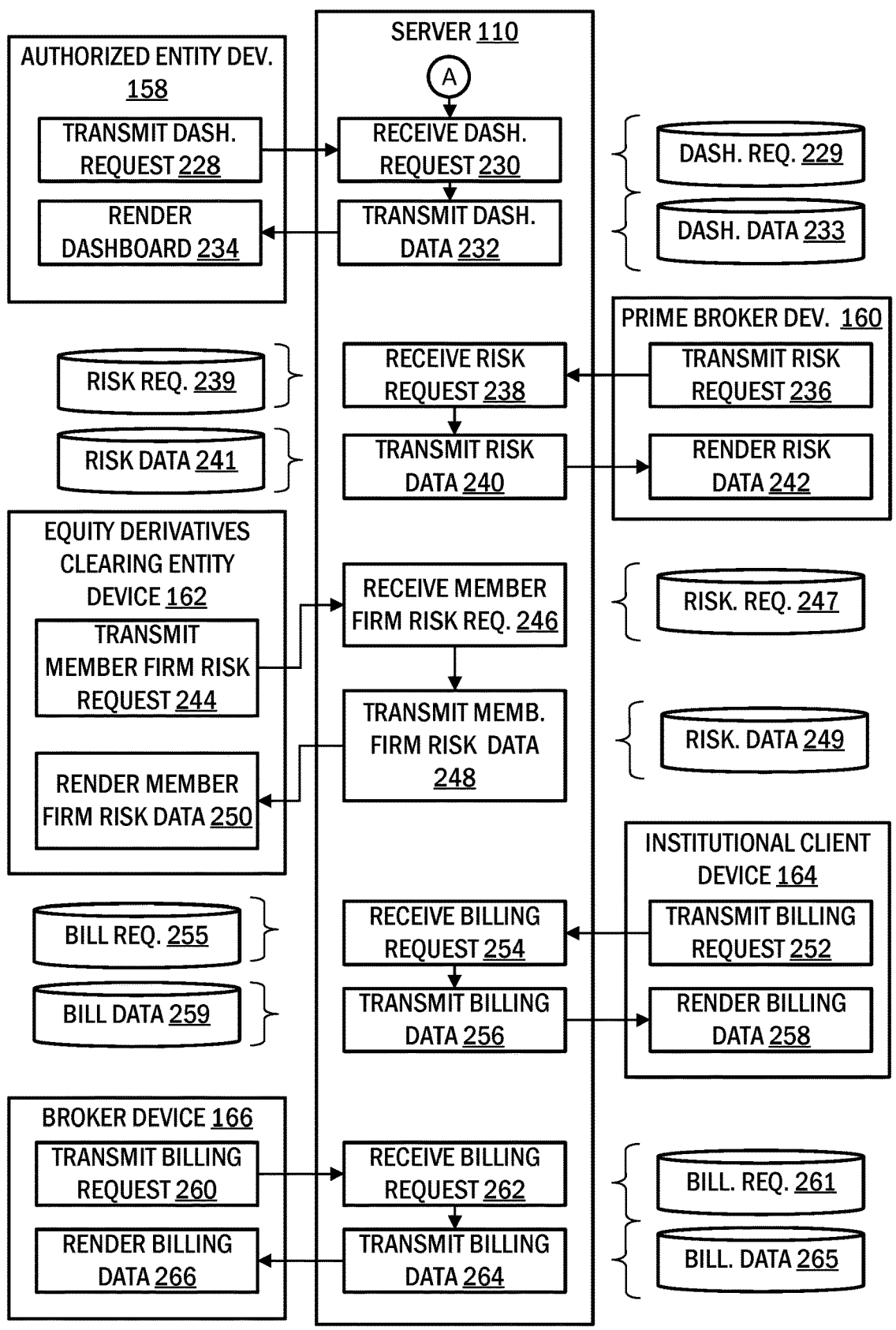

FIG. 2, which is made up of FIG. 2A and FIG. 2B, illustrates a method 200. The method 200 can be a process via which one or more components of the system 100 can interact to achieve improved auditability into transactions performed by brokers while also preserving anonymity, thereby providing improvements over traditional transaction technology. The method 200 can begin with operation 202.

Operation 202 includes a registration device 152 transmitting registration data 203 to the server 110. The registration data 203 can be data regarding an institutional customer that is being registered with the server 110 by a user of the registration device 152. The registration data 203 can include information, such as a name or other identifier of the customer and a fund or clearing agent of the customer. In some examples, the registration data 203 further includes the name or other identifier of one or more brokers authorized to act on behalf of the customer. In some examples, the registration data 203 can include additional information, such as an address, contact information, or other information regarding the customer being registered. The registration data 203 can also include data regarding users or entities authorized to access data associated with the customer at the server 110. The registration data 203 can be obtained at the registration device 152 from, for example, a person using the registration device 152. In some examples, the registration device 152 obtains the registration data 203 via a form user interface (e.g., provided by the server 110 at the registration device 152) for obtaining some or all of the registration data 203. The transmission itself can occur using any of a variety of techniques. In some examples, the server 110 or a device associated with the server 110 provides a portal via an Internet site (e.g., a website) and the transmission occurs over a connection with the site. Following operation 202, the flow of the method 200 can move to operation 204.

Operation 204 includes the server 110 receiving the registration data 203. As described above, the server 110 can provide a form user interface over which the registration data 203 can be obtained. In other examples, the server 110 receives the registration data 203 over an application programming interface. While the registration data 203 is shown as a single set of data, it need not be. For example, the registration data 203 can be broken up into multiple sets of data received at the server 110 together or separately. Following operation 204, the flow of the method 200 can move to operation 206.

Operation 206 includes the server 110 registering the customer based on the received registration data 203. The operation can include registering the customer in association with a set of customer data 207. The set of customer data 207 can include one or more data entries regarding the customer that are stored in a data structure (e.g., a database) of the data store 112. The set of customer data 207 can include a customer identifier, a fund or clearing agent identifier, and a broker identifier. The set of customer data 207 can include some or all of the data from the registration data 203. In some examples, the customer data 207 can include data not included directly in the registration data 203 but is derived from the data provided in the registration data 203. For example, as described herein, one or more sub-identifiers can be generated and combined based on the registration data 203 to form some or all of the set of customer data 207.

Operation 208 includes the server 110 generating an identifier 209. The identifier 209 can be a piece of data (e.g., text data) usable to tag a transaction so one or more associated entities can be later identified using the identifier 209. In examples, the identifier 209 can be sufficiently long and generated in such a way as to uniquely tag the transaction. In some examples, the identifier 209 expires after a predetermined amount of time, such as a predetermined amount of time that is less than or equal to twenty-four hours. Upon expiration, the identifier 209 may no longer be or may no longer be trustable as being unique (e.g., the identifier 209 may be reused for a different set of associated entities), the identifier 209 may no longer be associated with the entities, or the identifier 209 may be flagged as being expired (e.g., such that its attempted use returns an error or warning message in addition to or instead of a desired result). The generated identifier 209 can be unique on a per-executing broker basis to facilitate billing. Advantageously, the generation operation 208 can keep customer anonymity in the control of the broker. For example, the information that Order and Execution Management Systems (OEMS) receive can be execution account information (e.g., which would already be in place) and the identifier 209, which to the OEMS would be viewed as pseudorandom data rather than data from which a customer or other entity can be readily discerned. The identifier 209 can be generated in any of a variety of ways.

In an example, the identifier 209 is generated by encrypting the set of customer data 207. As used here, encrypting can include converting underlying data to a form that resists understanding by unauthorized entities. For instance, the set of customer data 207 can be encrypted using a cipher and a key (e.g., a symmetric or asymmetric key) to create the identifier 209 (e.g., the set of customer data 207 in an enciphered form that resists understanding by those unable to decrypt the enciphered data with the correct key). In some examples, generating the identifier 209 can further include encrypting the set of customer data 207 and a salt with the key. In such examples, the salt can change on a regular or as-needed basis, such that multiple different identifiers 209 can be generated that refer to the same underlying customer data 207 but are different from each other. This use of a salt can further enhance privacy and security by resisting analysis or reverse engineering of the underlying data. Upon decryption, the salt can be separated from the customer data 207 and discarded.

In some examples, generating the identifier 209 by encrypting the set of customer data 207 includes generating a random or pseudorandom value using a number generator. The generated value is then associated with the set of customer data 207 in a data structure (e.g., a lookup table). Then the value is used the identifier 209. In this manner, the value resists understanding to those entities that lack the ability to look up the corresponding set of customer data 207 in the data structure.

In an example, the set of customer data 207 from which the identifier 209 is generated (e.g., using the process above) includes one or both of a short code and a broker sub-identifier. In some examples, the short code is formed from a customer sub-identifier and a fund/clearing-agent sub-identifier. In an example, the short code is a concatenation of the customer sub-identifier with the fund/clearing-agent sub-identifier. In some examples, the short code is a concatenation of a shortened form of the customer sub-identifier with a shortened form of the fund/clearing-agent sub-identifier. In an example, brokers are able to associate the short codes with execution accounts associated with one or more front-end devices 154 of the broker. A single broker can be associated with multiple different short codes and in some examples, a same short code can be associated with multiple different execution accounts (e.g., available through different financial institutions).

In some examples, the generating of the identifier can include assigning or obtaining the customer sub-identifier to or from the customer (e.g., the customer associated with the set of customer data 207). In some examples, the assigning is performed as part of the registration operation 206. The customer sub-identifier can include alphabet characters that form all of or a shortened form of the name of the customer. In another example, the customer sub-identifier is formed from alpha-numeric characters or symbols. In some examples, the customer sub-identifiers can all have a fixed length (e.g., six characters long) or have variable lengths. In some examples, the customer's name may or may not be readily discernable form the customer sub-identifier. In many examples, there is a one-to-one relationship between a customer and a customer sub-identifier (e.g., each customer is associated with only one customer sub-identifier and each customer sub-identifier is associated with only one customer). In other examples, there is a many-to-one relationship, one-to-many relationship, or a many-to-many relationship.

In some examples, the generating process can include assigning or obtaining the fund/clearing-agent sub-identifier to an associated fund/clearing agent. In some examples, the assigning is performed as part of the registration operation 206. The fund/clearing-agent sub-identifier can include alphabet characters that form an acronym or other shortened form of the name of the fund or clearing agent. In another example, the customer sub-identifier can be made from alpha-numeric characters or be formed from symbols. In some examples, the fund/clearing-agent sub-identifiers can all have a fixed length (e.g., six characters long) or have variable lengths. In some examples, the fund/clearing-agent name may or may not be readily discernable form the customer sub-identifier. In many examples, there is a one-to-one relationship between a fund or clearing agent and a fund/clearing-agent sub-identifier (e.g., each fund or clearing agent is associated with only one fund/clearing-agent sub-identifier and each fund/clearing-agent sub-identifier is associated with only one fund or clearing agent). In other examples, there is a many-to-one relationship, one-to-many relationship, or a many-to-many relationship.

In some examples, the generating process can include assigning or generating a broker sub-identifier to an associated broker that is authorized to act on behalf of the customer. In some examples, the assigning is performed as part of the registration operation 206. The broker information can be provided as part of the registration data 203. In other examples, the broker data can be provided as part of subsequent registration processes (e.g., after registering, the customer is able to add authorized brokers via a portal). The broker sub-identifier can include alphabet characters that form an acronym or other shortened form of the name of the broker. In another example, the broker sub-identifier can be made from alpha-numeric characters or be formed from symbols. In some examples, the broker sub-identifiers can all have a fixed length (e.g., six characters long) or have variable lengths. In some examples, a name of the broker may or may not be readily discernable form the broker sub-identifier. In many examples, there is a one-to-one relationship between a broker and a broker sub-identifier (e.g., each broker is associated with only one broker sub-identifier and each broker sub-identifier is associated with only one fund or clearing agent). In other examples, there is a many-to-one relationship, one-to-many relationship, or a many-to-many relationship.

Following operation 208, the flow of the method 200 can move to operation 210.

Operation 210 includes the server 110 transmitting the identifier 209 to a front-end device 154. In an example, the transmitting includes transmitting the identifier 209 with a set of identifiers that are formatted according to a start-of-day file format. For example, vendors of the front-end devices (e.g., BLOOMBERG, FIDESSA, or BLAZE) can specify a particular format (e.g., a comma-separated value format or XML format) for which one or more identifiers 209 can be specified. The server 110 can transmit the one or more identifiers 209 according to that format.

The transmitting of the identifier 209 can be performed in any of a variety of ways. In an example, the transmitting is performed according to a schedule. The schedule can be defined by, for example, the customer, the broker, or an entity controlling the server 110. In an example, the schedule specifies a frequency at which the identifiers 209 are transmitted. For instance, the schedule may specify that the identifiers are provided at the start of business each business day. In other examples, the schedule can specify multiple times per day (e.g., on an hourly basis) or per week that the identifiers 209 are transmitted. In some examples, the one or more identifiers 209 are transmitted to the front-end devices 154 in response to a pull request. For instance, the server 110 can receive a request from a front-end device 154 and provide, in response thereto, a set of one or more identifiers 209. The one or more identifiers 209 can be made available via particular protocols, such as FTP (File Transfer Protocol).

Following operation 210, the flow of the method 200 can move to operation 212. Operation 212 includes the front-end device 154 receiving the identifier 209. Following operation 212, the flow of the method 200 can move to operation 214.

Operation 214 includes the front-end device 154 generating a transaction, such as a buy or sell order for a customer. This operation 214 can include generating transaction data 217 to be provided to an exchange 156. The transaction data 217 can include data necessary for the exchange 156 to execute the transaction, such as symbol, side, quantity, and price data. An identifier 209 of the one or more identifiers 209 that are associated with the customer associated with the transaction can also be added to the transaction data 217. Following operation 214, the flow of the method 200 can move to operation 216.

In some examples, the transaction data 217 is generated partially or wholly by the client, and the identifier 209 can be associated with the transaction data 217 by the client directly. A client can enter an order directly, which is then received by the broker and passed along. For example, a hedge fund trader enters an order to buy one-hundred calls in stock XYZ directly in a front end on the trader's desk, and the order is associated with an identifier. The broker would then receive that order and the identifier would still be on that trade and passed along. In such an example, the broker would not need to "enter" the trade for the client just take it to the exchange and execute it.

Operation 216 includes the front-end device 154 transmitting transaction data 217 to an exchange 156. The transaction data 217 can include the identifier 209. The transaction data 217 can be transmitted to the exchange 156 directly or through an intermediary using any applicable protocol or technique (e.g., using the FIX protocol). Following operation 216, the flow of the method 200 can move to operation 218.

Operation 218 includes the exchange 156 receiving the transaction data 217. Following operation 218, the flow of the method 200 can move to operation 220. Operation 220 includes the exchange 156 executing a transaction based on the transaction data 217. Following operation 220, the flow of the method 200 can move to operation 222.

Operation 222 includes the exchange 156 transmitting an execution report 223 relating to the transaction. The execution report 223 can be a public or private (e.g., visible to those entities subscribing to receive such reports) report describing details of the transaction carried out based on the transaction data 217 with the exchange 156. Among the details of the transaction is the identifier 209 provided with the transaction data 217 that was processed to execute the transaction. As described above, the identifiers 209 can encrypt the set of customer data 207. So although the identifier 209 with the execution report 223 can be viewed by a group of entities beyond those parties to the transaction (e.g., the institutional customer, the counterparty, and associated brokers) be at least semi-public, the identifier 209 would not readily reveal the underlying customer data (e.g., it may appear to be a pseudorandom grouping of characters). Following operation 222, the flow of the method 200 can move to operation 224.

Operation 224 includes the server 110 receiving, from the execution report 223 containing the identifier 209. In an example, the server 110 can subscribe to or otherwise be configured to receive or obtain execution reports 223 as they are provided by the exchange. The server 110 can receive the execution report 223 via such a configuration. The server 110 can, but need not, receive the execution report 223 via the exchange 156. In some examples, the execution report 223 is provided via an intermediary (e.g., the clearing entity 162). Following operation 224, the flow of the method can move to operation 226.

Operation 226 includes the server 110 determining the set of customer data 207 from the identifier 209 of the executed transaction report 223. The determining of the set of customer data 207 can be determined in any of a variety of ways. For example, where the identifier 209 encrypts the customer data 207, the identifier 209 can be decrypted using the key with which the customer data 207 was encrypted. In other examples, the customer data 207 is obtained using a lookup table that associated identifiers 209 with particular customer data 207.

After determining the set of customer data 207, the details of the transaction performed as part of the execution report 223 can be stored in a data structure (e.g., a database) in association with the customer data 207, such as in the data store 112. Through this process, the server 110 can build a collection of data that can be used to associate particular customer data with particular transactions. As is described in the following sections, this association can be beneficial in providing detailed information regarding the transactions to authorized entities as is described in the following operations.

Operation 228 includes an authorized entity device 158 transmitting a dashboard request 229. The authorized entity device 158 can be a device authorized to access data provided by the server 110. For example, a user that is authorized to access the data at the server 110 can provide login credentials to log into a portal associated with the server 110. This login process can cause the authorized entity device to receive a token (e.g., a cookie) that allows the authorized entity device 158 to access the server 110. Other techniques can be used to authorize the device 158 to access the server HO. The authorized entity device 158 can transmit a dashboard request 229. The dashboard request can be a request from the authorized entity device 158 to obtain a dashboard from the server 110. In some examples the request is generated by the authorized entity device receiving input from a user to actuate a user interface element associated with a dashboard (e.g., a button or tab user interface element of an application or web browser operating on the authorized entity device 158). In some examples, the request 229 is generated automatically on the authorized entity device 158 logging in to the server 110. In other examples the request is transmitted as part of an API call. In some examples, the request 229 can specify particular kinds of data to be obtained or other details about the data.

Operation 230 includes the server 110 receiving the dashboard request 229 from the authorized entity device 158.

Operation 232 includes the server 110 transmitting dashboard data 233 to the authorized entity device 158. The dashboard data 233 can include data regarding the transaction in association with the customer. In some examples, the server 110 can process the dashboard request 229. The process can include obtaining data based on the dashboard request 229. For example, the data can be obtained from the data store 112 and a query to access the data can be generated based on the dashboard request 229. The server 110 can also determine whether the authorized entity device 158 is authorized to access the data that is requested. For example, the server 110 can compare an access level granted to the authorized entity device 158 and the permissions required to access the data. The server 110 can generate dashboard data 233 based on the obtained data. The dashboard data 233 can be formatted to communicate the data to the dashboard device such that the authorized entity device 158 can generate a dashboard based thereon. In some examples, the dashboard data specifies the data to be rendered (e.g., the requested data). In other examples, the dashboard data can inside the user interface data to be rendered as well as the requested data. The dashboard data can be provided in any of a variety of ways. Although shown as a single set of data, the data can be provided multiple sets (e.g., packets) of data.

Operation 234 includes the authorized entity device 158 rendering a dashboard based on the dashboard data 233. The authorized entity device 158 can receive the dashboard data 233 and render the dashboard based on the dashboard data 233. Where the dashboard data 233 includes user interface data, the authorized entity device 158 can render the user interface data. In other examples, the authorized entity device 158, generates a user interface based on the dashboard data. Then the authorized entity device 158 can render the dashboard for display by the authorized entity device 158. The authorized entity device 158 can receive input from the user as the user interacts with the user interface. This interactions can be used to generate new dashboard requests 229 and the flow of the process can return to operation 208.

In an example, the authorized entity device 158 is a device used by an institutional customer. In such an example, the dashboard request 229 may relate to trade details (e.g., symbol, side, quantity, and price). The resulting dashboard data 233 can include information, such as a list of approved and unapproved trades. The dashboard data 233 can further show matched status.

In an example, the authorized entity device 158 is a device used by a broker. In such an example, the resulting dashboard data 233 can include information such as trade details (e.g., symbol, side, quantity, and price). The dashboard data 233 can include information regarding trade matches (e.g., clearing versus booking), which can include bucketed versus fully booked trades. In examples, the dashboard data 233 can further include user interface elements for updating the data store 112 with customer notes, which can include particular booking methods that have not been allocated via pre-approved keys or via a user interface. The data store 112 can interface with a customer allocation screen so the broker can be notified of customer allocation information (e.g., when identifiers 209 will be made available). But certain information may be prevented from being accessed by a broker, such as full custody chain that includes customer, executing broker, and exchange data. In examples, the dashboard data 233 presented can be sortable by customer, prime broker, executing brokerage firm, give-up, CMTA, and discrepancies. In examples, there can be a discrepancy user interface for returning trades to an executing broker.

Specific examples and variants of operations 228, 230, 232, and 234 are described in more detail below in reference to requests from prime broker devices 160, clearing entity devices 162, institutional customer devices 164, and broker devices 166.

Operation 236 includes a prime broker device 160 transmitting a risk request 239 to the server 110. Prime brokers can access data provided by the server 110 to obtain data regarding risk, such as CMTA risk and give-up risk. In an example, prime broker can obtain such data using the prime broker device 160 to transmit a risk request 239 to the server 110. Prior to or during the sending of the request, the prime broker device 160 can authenticate with the server 110 to obtain access to the data (e.g., using one or more techniques described above). The risk request can include a general risk request or for details regarding specific kinds of risk. The prime broker device 160 can generate the risk request 239 based on data obtained from a prime broker via a user interface of the prime broker device 160. Following operation 236, the flow of the method 200 can move to operation 238.

Operation 238 includes the server 110 receiving the risk request 239. The server 110 can process the risk request 239 to obtain risk data 241 that fulfills the request. In an example, the risk data 241 is obtained from a the data store 112 (e.g., a database thereof storing information about transactions). The risk data 241 can include, for example, data that allows the requesting prime broker to see individual customer risk in real time. Following operation 238, the flow of the method 200 can move to operation 240. Operation 240 includes the server 110 transmitting risk data 241 to the prime broker device 160. Following operation 240, the flow of the method 200 can move to operation 242. Operation 242 includes the prime broker device 160 rendering the risk data 241.

Operation 244 includes a clearing entity device 162 transmitting a risk request 247 to the server 110. The risk request 247 can include a request for information regarding trade details (e.g., symbol, side, quantity, or average price price) for member entities of the equity derivatives clearing entity. The risk request 247 can also be used to obtain data regarding trade matched clearing and booking information. Following operation 244, the method can move to operation 246. Operation 246 includes the server 110 receiving the risk request 247. Following operation 246, the method can move to operation 248. Operation 248 includes the server 110 transmitting risk data 249 to clearing entity device 162. Following operation 248, the method can move to operation 250. Operation 250 includes the clearing entity device 162 rendering the risk data 249. In some examples, rendering the risk data 249 includes showing a full customer/executing broker/exchange custody chain. In examples, data regarding full industry trades with emphasis on current industry unallocated and unmatched trades is presented. For example, trades executed in unapproved keys unallocated by customers and trades sent to prime brokers without approved keys or finished allocations. The risk data 249 can include outstanding discrepancies by brokers. The risk data 249 can be sortable by customer, prime broker, executing brokerage firm, give-up, CMTA, and discrepancies.

Operation 252 includes an institutional customer device 164 transmitting a billing request 255. Following operation 22, the method can move to operation 254. Operation 254 includes the server 110 receiving the billing request 261. Following operation 254, the method can move to operation 256. Operation 256 includes the server 110 transmitting billing data 259 to the institutional customer device 164. Following operation 256, the method can move to operation 258. Operation 258 includes the institutional customer device 164 rendering billing data 259.

Operation 260 includes a broker device 166 transmitting a billing request 261. Following operation 260, the method can move to operation 262. Operation 262 includes the server 110 receiving the billing request 261. Following operation 262, the method can move to operation 264. Operation 264 includes the server 110 transmitting billing data 265. Following operation 264, the method can move to operation 266. Operation 266 includes the broker device 166 rendering the billing data 265.

Example Workflow

In an example, an institutional customer gives a broker an order to buy calls from a known prime broker. The broker can receive the order and enters the order into a front-end device 154 on behalf of the institutional customer for execution. The front-end device 154 adds an identifier 209 to a transaction message (e.g., formatted according to the FIX protocol), which is then sent to an exchange. The order is filled at the exchange and the identifier 209 is used with associated messages. An equity derivatives clearing entity (e.g., the OCC) can receive a message regarding the executed transaction that includes the identifier 209. The server 110 can obtain the message regarding the executed transaction from the equity derivatives clearing entity. The server 110 decodes the identifier 209 to obtain customer data 207, which is stored (e.g., in the data store 112). Then the server 110 can provide associated data to requesting entities depending on the status or authorization of the requesting entity. For example, where the requesting entity is the prime broker, the prime broker can be presented with a dashboard that presents the transaction information in real time along with associated customer information. Where the requesting entity is the executing broker, the executing broker is provided with trade details, customer information, and a matched status of the trade. Where the requesting entity is an institutional customer, the institutional customer can be provided with trade details and matched status.

In another example, an institutional customer gives a broker an order to buy calls from an unknown prime broker. The workflow can be the same as or similar to the one presented above, but the information provided to the requesting entities can be different. For example, a prime broker may not be alerted at the time of the trade because the information is unknown. The executing broker can be presented with a dashboard that includes trade details, customer information and matched status. The institutional customer can be provided with trade details and be prompted for prime broker information. Either the broker or the institutional customer can enter prime broker information, which can be allocated to one or more prime brokers. Then, once the prime broker is allocated, then information can be presented to the prime broker via a dashboard.

User Interfaces

FIGS. 3-6 illustrate example user interfaces that can be displayed to a requesting entity, such as at an authorized entity device 158. For example, some or all of the data used to create the user interfaces can be provided as part of the dashboard data 233.

FIG. 3 illustrates an example execution screen dashboard 300. The dashboard 300 can be presented to an authorized user. As illustrated, the dashboard 300 includes information regarding executed transactions, including the date of the trade, the time of the trade, the account identifier, the security type, the trade symbol, the trade side, the 0/C, the execution quantity, the execution price, and the principal amount. As illustrated, the presented data can be filtered by particular accounts, date ranges, and a search. The data can be grouped, such as by child execution, individual orders, and symbol/side data.

As illustrated, the dashboard 300 can be a web-based user interface that is provided within a web browser (e.g., in this case GOOGLE CHROME, but any compatible web browser can be used). As further illustrated, the a user named "User" is logged into or otherwise authenticated with the server 110. For example, prior to presenting this dashboard 300, the server 110 can present a login page to obtain login credentials (e.g., a username and password) from a user.

Figure 4:
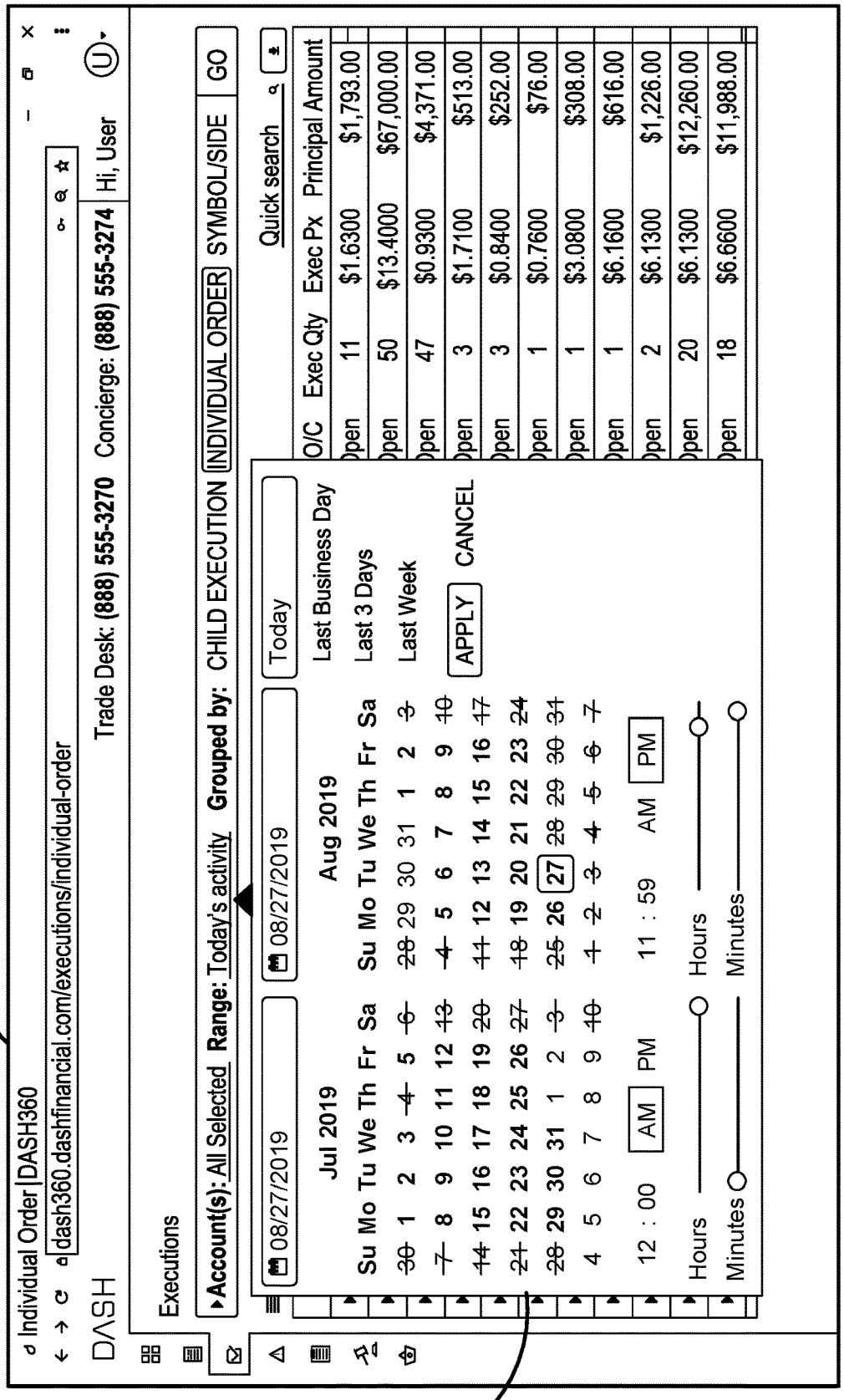
FIG. 4 illustrates an example execution screen dashboard having a date range selector user interface element.

FIG. 4 illustrates the example execution screen dashboard 300 of FIG. 3 having a date range selector user interface element 410. The date range selector user interface element 410 can be presented responsive to a user actuating a corresponding user interface element (e.g., clicking or tapping on a region associated with range data). As illustrated, the element 410 allows the user to select a date and time range for which data can be displayed. The element 410 can include one or more calendars of selectable dates. The illustrated user interface provides an improved interaction by marking dates on which one or more markets are closed (e.g., not just weekends but also holidays or other market closings). This can help avoid wasting processing and resources on displaying data for dates for which there is unlikely to be valid data. In some examples, the dates are marked to help the user avoid those dates but can be selected. In other examples, the user is prevented from selecting such dates. Responsive to the user specifying a date and time (or approving of a currently-selected date and time), the element 410 can close and the data presented in the execution screen dashboard 300 can be modified based on the selections made in the element 410.

FIG. 5 illustrates an example allocations screen dashboard 500. The dashboard 500 can be presented to an authorized user. As illustrated, the dashboard 500 includes information regarding allocations on a by clearing account basis, including account name, clearing identifier, symbol, security type, side, allocation quantity, and average price.

FIG. 6 illustrates an example clearing dashboard 600 displaying clearing data. The dashboard 600 can be presented to an authorized user. The dashboard can displaying clearing information, such as submission time, trading firm, associated symbol, requesting user, claiming user, and status. The dashboard 600 can display further data, including exchange name, symbol, expiration date, side, open/closed status, execution price, total quantity, GUP, CMTA, associated account, capacity, clearing entity, and customer identifier, among other data.

Computing Environment

Figure 7:
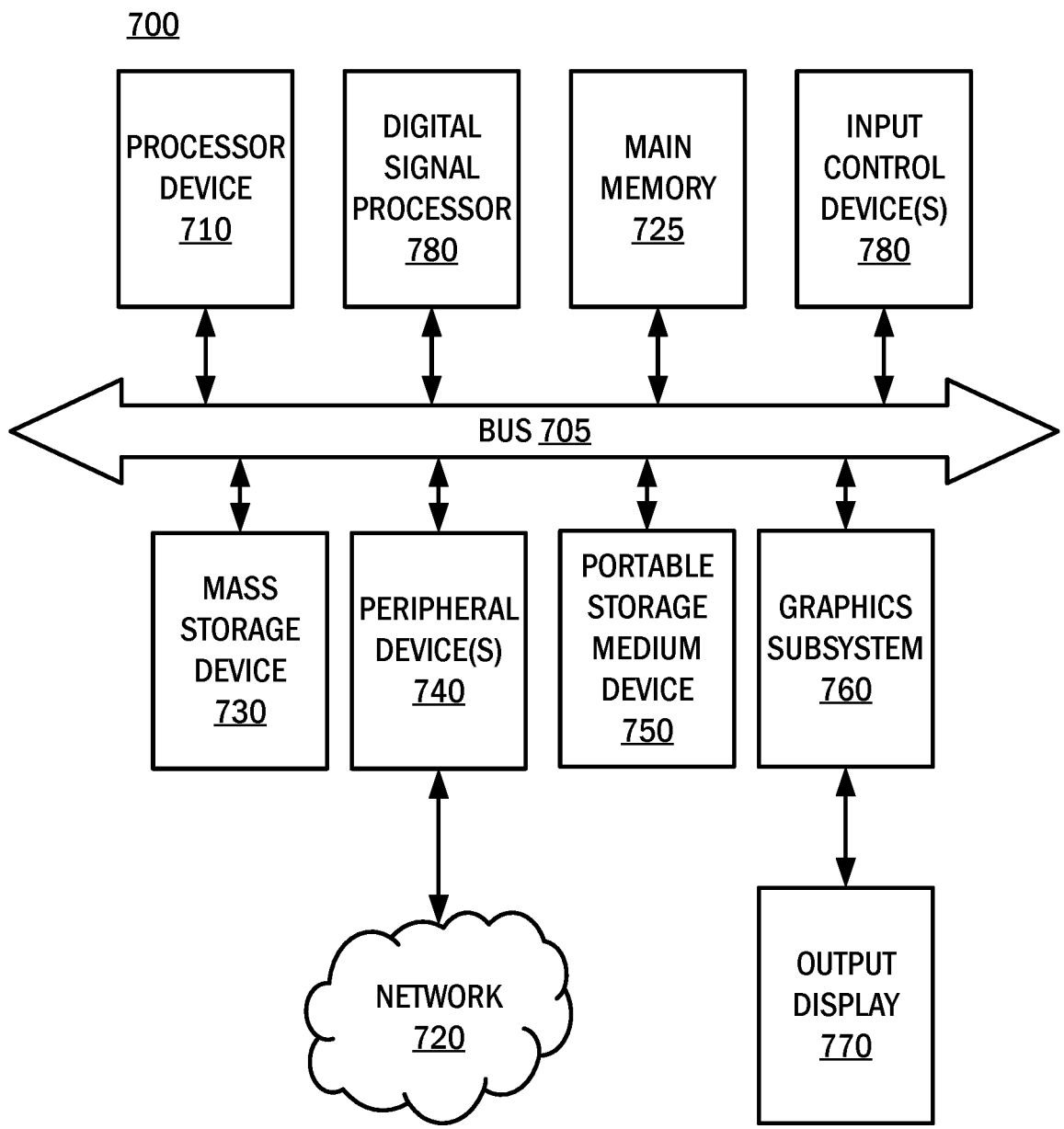
FIG. 7 is a block diagram showing an example computation system constructed to realize the functionality of the example embodiments described herein.

FIG. 7 is a block diagram showing an example computation system 700 constructed to realize the functionality of the example embodiments described herein.

System 700 may include without limitation a processor device 710, a main memory 725, and an interconnect bus 705. The processor device 710 may include without limitation a single microprocessor, or may include a plurality of microprocessors for configuring the system 700 as a multi-processor computation system. The main memory 725 stores, among other things, instructions and/or data for execution by the processor device 710. The main memory 725 may include banks of dynamic random access memory (DRAM), as well as cache memory.

The system 700 may further include a mass storage device 730, peripheral device(s) 740, portable non-transitory storage medium device(s) 750, input control device(s) 780, a graphics subsystem 760, and/or an output display interface 770. A digital signal processor (DSP) 780 may also be included to perform signal processing. For explanatory purposes, all components in the system 700 are shown in FIG. 7 as being coupled via the bus 705. However, the system 700 is not so limited. Elements of the system 700 may be coupled via one or more data transport means. For example, the processor device 710, the digital signal processor 780 and/or the main memory 725 may be coupled via a local microprocessor bus. The mass storage device 730, peripheral device(s) 740, portable storage medium device(s) 750, and/or graphics subsystem 760 may be coupled via one or more input/output (I/O) buses. The mass storage device 730 may be a nonvolatile storage device for storing data and/or instructions for use by the processor device 710. The mass storage device 730 may be implemented, for example, with a magnetic disk drive or an optical disk drive. In a software embodiment, the mass storage device 730 is configured for loading contents of the mass storage device 730 into the main memory 725. Instructions for performing methods according to example embodiments herein can be stored in mass storage device 730 and/or main memory 725.

The portable storage medium device 750 operates in conjunction with a nonvolatile portable storage medium, such as, for example, a solid state drive (SSD), to input and output data and code to and from the system 700. In some embodiments, the software for storing information may be stored on a portable storage medium, and may be inputted into the system 700 via the portable storage medium device 750. The peripheral device(s) 740 may include any type of computer support device, such as, for example, an input/output (I/O) interface configured to add additional functionality to the system 700. For example, the peripheral device(s) 740 may include a network interface card for interfacing the system 700 with a network 720.

The input control device(s) 780 provide a portion of the user interface for a user of the computer 700. The input control device(s) 780 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the system 700 may include the graphics subsystem 760 and the output display 770. The output display 770 may include a display such as a CSTN (Color Super Twisted Nematic), TFT (Thin Film Transistor), TFD (Thin Film Diode), OLED (Organic Light-Emitting Diode), AMOLED display (Activematrix Organic Light-emitting Diode), and/or liquid crystal display (LCD)-type displays. The displays can also be touchscreen displays, such as capacitive and resistive-type touchscreen displays.

The graphics subsystem 760 receives textual and graphical information, and processes the information for output to the output display 770.

Input control devices 780 can control the operation and various functions of system 700.

Input control devices 780 can include any components, circuitry, or logic operative to drive the functionality of system 700. For example, input control device(s) 780 can include one or more processors acting under the control of an application.

Each component of system 700 may represent a broad category of a computer component of a general and/or special purpose computer. Components of the system 700 are not limited to the specific implementations provided herein.

Software embodiments of the examples presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments have events that occur in real time. This can refer to actions that take place without substantial delay and includes events occurring near real time. For example, delays caused by network propagation and processing can occur and the event can still be considered real time. Real time can refer to a delay of less than approximately fifteen minutes.

Some embodiments include a computer program product. The computer program product may be a storage medium or media having instructions stored thereon or therein which can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described herein.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the illustrated computing environment is presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method comprising:
   by a server:
   receiving registration data regarding a customer from a registration device;
   registering the customer in association with a set of customer data based on the registration data;
   generating an identifier that encrypts the set of customer data, wherein the identifier uniquely identifies the customer;
   transmitting the identifier to a front-end device;
   receiving an executed transaction report containing the identifier and relating to an executed transaction from an exchange;
   determining the set of customer data by decrypting the identifier of the executed transaction report;
   receiving a dashboard request from an authorized entity device to access data associated with the executed transaction, wherein the authorized entity device is authorized to access data associated with the customer;
   determining the authorized entity device is authorized to access the data associated with the executed transaction based on the set of customer data; and
   providing, in real time, dashboard data that includes data regarding the executed transaction to the authorized entity device based on determining the authorized entity device is authorized to access the data.

2. The method of claim 1, further comprising:
   receiving a set of broker data regarding a broker from the customer; and
   registering the broker in association with the customer, wherein the identifier is further generated based on the registered broker.

3. The method of claim 1, wherein the identifier expires after a predetermined amount of time.

4. The method of claim 3, wherein the predetermined amount of time is less than or equal to twenty-four hours.

5. The method of claim 1, wherein the set of customer data includes: a customer identifier, a fund or clearing agent identifier, and a broker identifier.

6. The method of claim 1, wherein generating the identifier includes encrypting the set of customer data with a key.

7. The method of claim 6, wherein generating the identifier further includes encrypting the set of customer data and a salt with the key.

8. The method of claim 1, wherein generating the identifier that encrypts the set of customer data includes:
   generating a pseudorandom value;
   associating the pseudorandom value with the set of customer data in a data structure; and
   using the pseudorandom value as the identifier.

9. The method of claim 1, further comprising:
   generating a billing report based on a plurality of received executed transaction reports; and
   transmitting the billing report to an entity device.

10. The method of claim 1, further comprising:
    generating a compliance audit report based on a plurality of received executed transaction messages; and
    transmitting the compliance audit report to an entity device.

11. A system comprising:
    one or more servers comprising one or more processor devices;
    a front-end device comprising one or more processor devices,
    wherein the one or more servers are configured to:
    receive registration data regarding a customer from a registration device;
    register the customer in association with a set of customer data;
    generate an identifier that encrypts at least some of the set of customer data, wherein the identifier uniquely identifies the customer; and
    provide the identifier to the front-end device;
    wherein the front-end device is configured to:
    receive the identifier;
    generate transaction data that includes the identifier; and
    transmit the transaction data to an exchange; and
    wherein the one or more servers are further configured to:
    receive, from the exchange, an executed transaction message containing the identifier and relating to an executed transaction;
    determine the set of customer data by decrypting the identifier of the received message;
    receive a dashboard request from an authorized entity device to access data associated with the executed transaction, wherein the authorized entity device is authorized to access data associated with the customer;
    determine the authorized entity device is authorized to access the data associated with the executed transaction based on the set of customer data; and
    provide, in real time, dashboard data that includes data regarding the executed transaction to the authorized entity device based on determining the authorized entity device is authorized to access the data.

12. The system of claim 11, wherein the one or more servers are further configured to:
    receive, from the customer, a set of broker data regarding a broker; and
    register the broker in association with the customer, wherein the identifier is further generated based on the registered broker.

13. The system of claim 11, wherein the identifier expires after a predetermined amount of time that is less than or equal to twenty-four hours.

14. The system of claim 11, wherein the set of customer data includes: a customer identifier, a fund or clearing agent identifier, and a broker identifier.

15. The system of claim 11, wherein generating the identifier includes encrypting the set of customer data and a salt with a key.

16. The system of claim 11, wherein generating the identifier that encrypts the set of customer data includes to:
generate a pseudorandom value;
associate the pseudorandom value with the set of customer data in a data structure; and
use the pseudorandom value as the identifier.

17. The system of claim 11, wherein the one or more servers are further configured to:
generate a billing or compliance report based on a plurality of received executed transaction reports; and
transmit the report to an entity.

18. A method comprising:
by a server:
receiving registration data regarding a plurality of customers;
registering the plurality of customers in association with a set of customer data based on the registration data;
generating identifiers that encrypt the set of customer data for the plurality of customers, wherein each identifier uniquely identifies an associated customer of the plurality customers;
for each respective broker of a plurality of brokers associated with one or more customers of the plurality of customers, periodically transmitting at least one identifier to one or more front-end devices each associated with one of the respective brokers for use in handling trades for the associated customer of the at least one identifier;
receiving one or more executed transaction reports, each executed transaction report containing one of the identifiers;
determining the set of customer data of for each executed transaction report by decrypting the identifier of each executed transaction report;
updating stored financial data based on the executed transaction reports and the decrypted identifier of each executed transaction report; and
providing dashboard data for rendering a dashboard visualizing at least some of the stored financial data to one or more authorized users.

19. The method of claim 18, further comprising:
providing varying levels of access to the stored financial data to requesting parties.

20. The method of claim 19, wherein providing the varying levels of access to the stored financial data to requesting parties includes:
providing to a prime broker device a real-time visualization of risk data associated with a customer of the prime broker based on the stored financial data via an application programming interface;
providing, to a clearing entity device, risk data in real-time without revealing customer identities to the equity derivatives clearing entity;
providing auditable billing data on a by-broker basis to an institutional customer; and
providing auditable billing data on a by-clients basis to one or more the plurality of brokers.

* * * * *